(12) United States Patent
Matama

(10) Patent No.: US 7,660,479 B2
(45) Date of Patent: Feb. 9, 2010

(54) IMAGE PROCESSING METHOD, IMAGE PROCESSING APPARATUS AND PROGRAM FOR THE SAME

(75) Inventor: Toru Matama, Asaka (JP)

(73) Assignee: Fujifilm Corporation, Tokyo (JP)

( * ) Notice: Subject to any disclaimer, the term of this patent is extended or adjusted under 35 U.S.C. 154(b) by 654 days.

(21) Appl. No.: 11/342,585

(22) Filed: Jan. 31, 2006

(65) Prior Publication Data

US 2006/0188171 A1 Aug. 24, 2006

(30) Foreign Application Priority Data

Feb. 23, 2005 (JP) .............................. 2005-047563

(51) Int. Cl.
*G06K 9/40* (2006.01)
*G06K 9/42* (2006.01)

(52) U.S. Cl. ....................................... 382/257; 382/274

(58) Field of Classification Search ......... 382/162–168, 382/115–123, 181, 257, 274, 308, 312; 348/77–78, 348/576–577, 362, 222; 358/518, 520
See application file for complete search history.

(56) References Cited

FOREIGN PATENT DOCUMENTS

| JP | 08-043315 A | 2/1996 |
|----|-------------|--------|
| JP | 10-75374 A | 3/1998 |
| JP | 10-243240 A | 9/1998 |
| JP | 2000-40154 A | 2/2000 |
| JP | 2003-079577 A | 3/2003 |

OTHER PUBLICATIONS

Japanese Office Action including English Translation issued on Aug. 25, 2009.

*Primary Examiner*—Yon Couso
(74) *Attorney, Agent, or Firm*—Birch, Stewart, Kolasch & Birch, LLP

(57) ABSTRACT

The image processing method according to the present invention comprises the steps of: performing morphology processing for removing a catch light in a pupil in an original image including a face image, calculating a difference between the original image and an image subjected to the morphology processing extracting a catch light region which includes the catch light based on the calculated difference, specifying a catch light region in the original image based on the extracted catch light region, and emphasizing the specified catch light region against the original image.

10 Claims, 7 Drawing Sheets

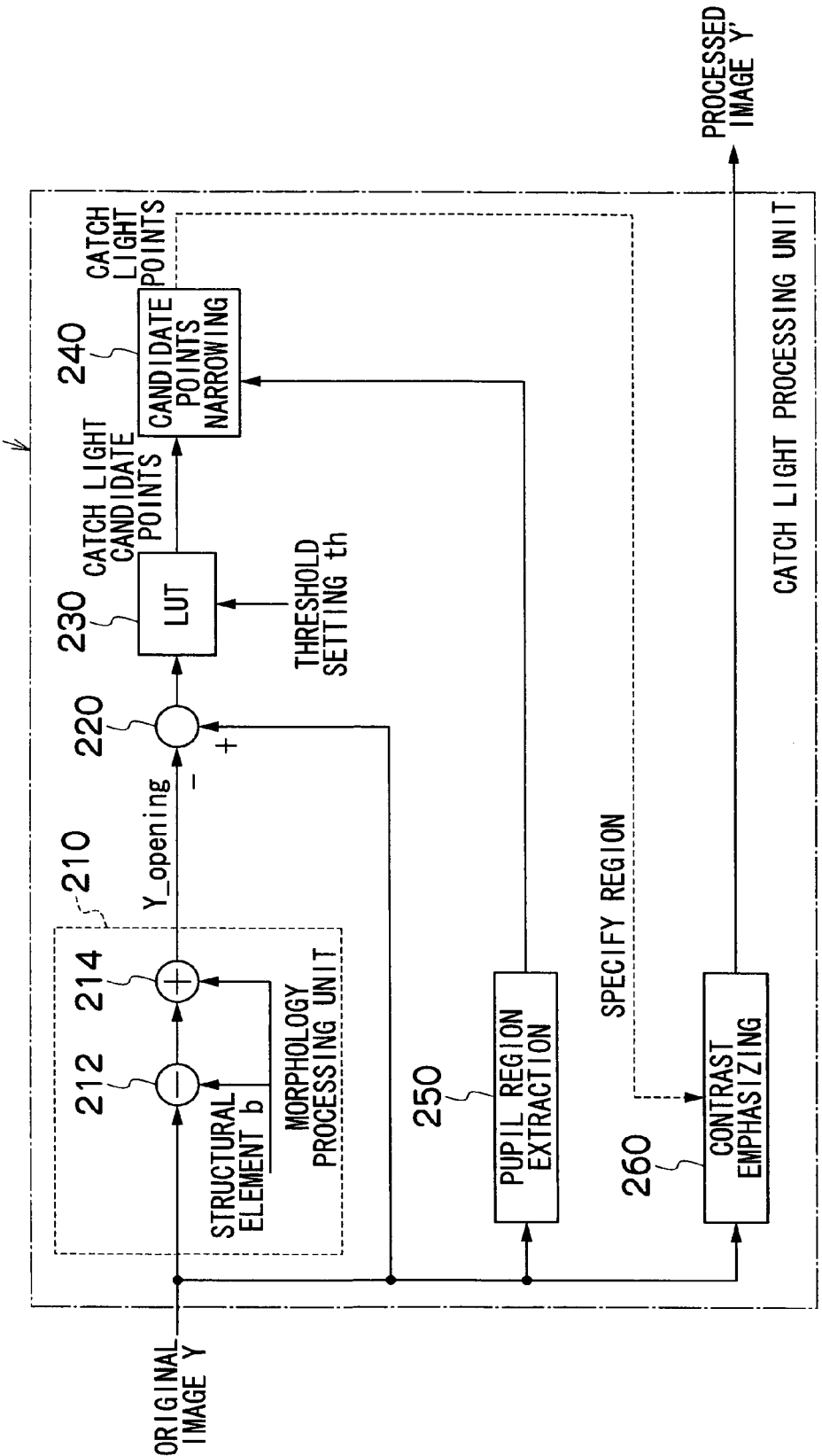

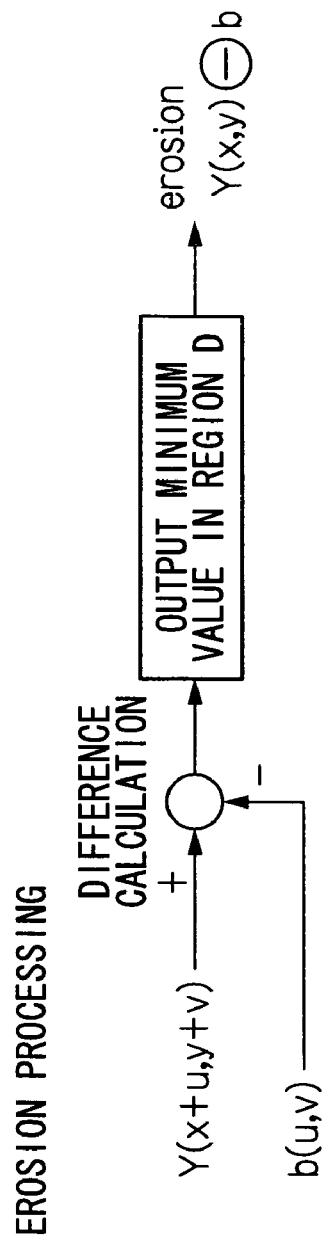
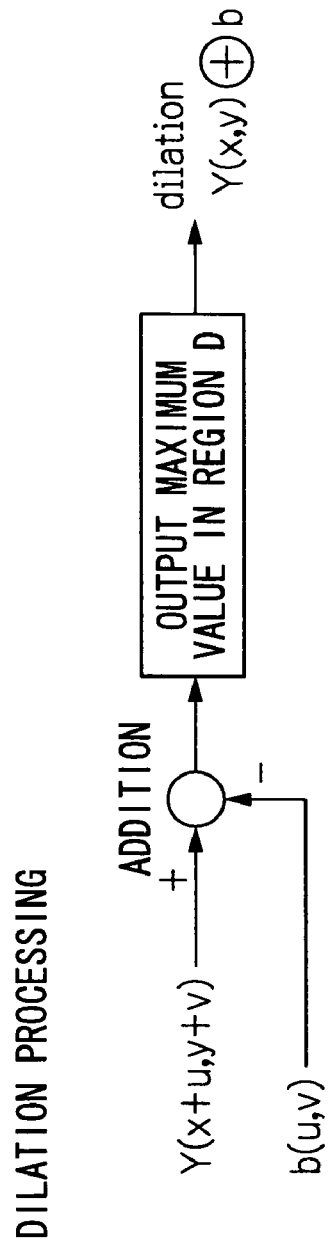

REGION D (x+2,y+2)

FIG.4B b(u, v) IS 0 IN REGION SHOWN BELOW,
AND −255 W THE OTHER REGION (−2,−2)

(0,0)

(2,2)

ORIGINAL IMAGE Y

Y-Y_opening

IMAGE PROCESSING METHOD, IMAGE PROCESSING APPARATUS AND PROGRAM FOR THE SAME

BACKGROUND OF THE INVENTION

1. Field of the Invention

The present invention relates to an image processing method, an image processing apparatus and an image processing program, more specifically to a technique of emphasizing catch lights in pupils.

2. Description of the Related Art

An amusement seal printing machine which combines and prints a face photograph and a template image is desired to print the face photograph by making the eyes bright and make the face impressive. Specifically, it is important to emphasize catch lights in pupils.

If sharpness is strengthened for the photographed image to "make eyes bright" and "make catch lights clear", however, the person's skin roughness is emphasized or a noise caught at taking the picture is emphasized. This may lead a problem in emphasizing roughness of the surface.

An image processing method (Japanese Patent Application Laid-Open No. 10-75374) has been proposed for solving the problem. This conventional method has an operator specify a region of an eye and strengthen a contrast in the region in order to emphasize catch lights in pupils.

Japanese Patent Application Laid-Open No. 2000-40154 discloses a technique for performing morphology filter process to prevent granulation of a film which appears on an image read from a photo film.

SUMMARY OF THE INVENTION

The method described in Japanese Patent Application Laid-Open No. 10-75374, however, has a problem in that it requires an operator to specify a region of an eye which includes catch lights and the operation is complicated. As the method needs an operator's manipulation, it cannot be applied to a store front amusement seal print machine.

The present invention is adapted in view of the circumstances and intends to provide an image processing method, an image processing apparatus and an image processing program by which only a catch light can be automatically emphasized.

In order to achieve the above object, an image processing method according to a first aspect of the present invention comprises the steps of: performing morphology processing for removing a catch light in a pupil in an original image including a face image; calculating a difference between the original image and a processed image subjected to the morphology processing; extracting a catch light region which includes the catch light based on the calculated difference; specifying a catch light region in the original image based on the extracted catch light region; and emphasizing the specified catch light region against the original image.

That is to say, the first aspect of the present invention removes a catch light in a pupil by performing morphology processing on an original image including a face image. A catch light region which includes the catch light (difference image) is extracted when a difference between the original image and the processed image subjected to the morphology processing is calculated. The present invention specifies the catch light region in the original image based on the extracted catch light region and emphasizes the specified catch light region against the original image.

The image processing method according to a second aspect is in the first aspect, the step of performing morphology processing performs opening processing on the original image by using a structural element in a pixel size corresponding to the catch light region.

The image processing method according to a third aspect is in the first or the second aspect, the step of extracting a catch light region comprises: the steps of calculating catch light candidate points by threshold processing the calculated difference with a predetermined threshold; the steps of extracting a pupil region from the original image; and the steps of narrowing catch light candidate points included in the extracted pupil region from the catch light candidate points, wherein the catch light region is extracted by making the narrowed catch light candidate points as catch light points.

That is to say, the third aspect of the present invention calculates a catch light candidate point without any noise by threshold processing the difference between the original image and a process image subjected to the morphology processing with a predetermined threshold. A region including a characterizing amount similar to a catch light is also extracted at this stage. Therefore, the present invention is adapted to extract a pupil region from an original image and further extract a catch light region by making only a catch light candidate point included in the pupil region as a catch light point.

The image processing method according to a fourth aspect is in any of the first to third aspects, the step of emphasizing a catch light region comprises at least one of process of emphasizing a contrast in the catch light region, process of enhancing brightness, process of enhancing sharpness, and expanding process.

An image processing apparatus according to a fifth aspect comprises an image inputting device for inputting an original image including a face image; a morphology processing device for performing morphology processing on the inputted original image and obtaining a processed image which is an image removed of a catch light in the pupil in the original image; a calculating device for calculating a difference between the original image and a process image subjected to the morphology processing; a catch light region extracting device for extracting a catch light region which includes the catch light based on the calculated difference; a catch light region specifying device for specifying a catch light region in the original image based on the extracted catch light region; and a catch light region emphasizing device for emphasizing the specified catch light region against the original image.

An image processing program according to a sixth aspect causes a computer to execute an inputting function of inputting an original image including a face image; a morphology processing function of performing morphology processing on the inputted original image and obtaining a processed image which is an image removed of a catch light in the pupil in the original image; a calculating function of calculating a difference between the original image and a processed image subjected to the morphology processing; a catch light region extracting function of extracting a catch light region which includes the catch light based on the calculated difference; a catch light region specifying function of specifying a catch light region in the original image based on the extracted catch light region; and a catch light region emphasizing function of emphasizing the specified catch light region against the original image.

The present invention can accurately extract a catch light region from an original image to be processed. This enables only a catch light region in an original image to be automatically emphasized.

BRIEF DESCRIPTION OF THE DRAWINGS

FIG. 2 a block diagram showing an embodiment of a catch light emphasizing unit of the image processing unit;

FIGS. 3A and 3B are diagrams for showing erosion processing and dilation processing, respectively;

FIG. 4A is a diagram showing a region corresponding to a structural element of 5×5;

FIG. 4B is a diagram showing a structural element of 5×5;

DETAILED DESCRIPTION OF THE PREFERRED EMBODIMENTS

Preferred embodiments of the image processing method, the image processing apparatus and the image processing program according to the present invention will be described in detail with reference to the attached drawings.

Figure 1:
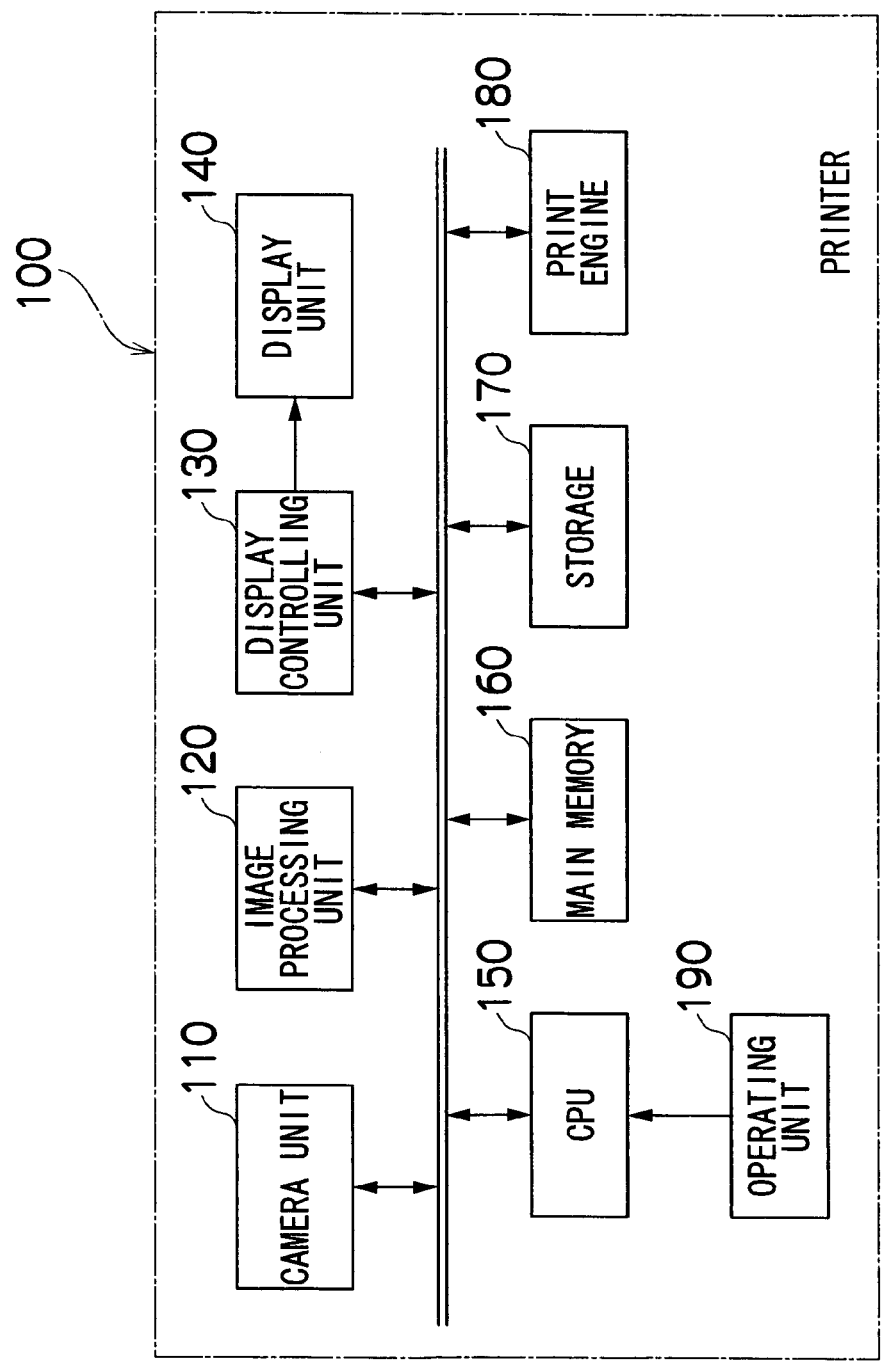
FIG. 1 is a block diagram showing an embodiment of a printer, to which the present invention is applied.

FIG. 1 is a block diagram showing an embodiment of a printer, to which the present invention is applied.

As shown in the figure, a printer 100 of the embodiment is an amusement seal printing machine set in a game parlor or at a store front. The printer 100 mainly includes a camera unit 110, an image processing unit 120, a display controlling unit 130, a display unit 140, a central processing unit (CPU) 150, main memory 160, storage 170, a print engine 180 and an operating unit 190.

The camera unit 110 takes a picture of a user's face and outputs digital color image data (R, G, B signals). The image processing unit 120 has a function of performing image processing according to the present invention based on the R, G, B signals outputted from the camera unit 110 (hereinafter referred to as "catch light emphasizing process"), a function of combining the user's face image and a prepared template image or graffiti and a function of creating data for photographic printing from the combined image data. The catch light emphasizing will be described in detail later.

The image processing unit 120 converts the R, G, B signals, which are subjected to various kinds of image processing, into Y, M, C (Yellow, Magenta, Cyan) signals, and outputs the converted Y, M, C signals to the print engine 180.

The display controlling unit 130 creates image data for displaying to display a user's face image on the display unit 140 from image data inputted from the camera unit 110 (image data showing a moving picture), outputs the image data for displaying to the display unit 140 for displaying the image or displays a combined image of the user's face image and the prepared template image on the display unit 140.

The CPU 150 is a processing unit for controlling over the whole system. The CPU 150 gives various instructions such as an instruction to take a picture to the camera unit 110, or to read image data from the camera unit 110 and process the read image data, or to pass image data to each of the controlling blocks or to perform photographic printing. The various instructions of processing to the CPU 150 are given from the operating unit 190 based on a user's operation. For example, the operating unit 190 has a button for a user to indicate a selection of a template image to be used in combining images, while viewing template images shown on the display unit 140, a button for a user to select a printing type for printing out the image, and the like. The operating unit 190 can be realized by soft buttons of a touch panel on the display unit 140.

The main memory 160 stores a controlling program of a printer. The main memory 160 is also used as a work area while the program is executed. The storage 170 is a non-volatile storing device and stores various template images or a look-up table (LUT) for threshold processing.

The print engine 180 employs the TA (thermo autochrome) scheme as a photographic printing scheme. The print engine 180 makes a sheet of color photographic paper with C, M, Y coloring layers (hereinafter referred to as "TA paper") itself color by heat and fixes the colors by predetermined wave length of light. The print engine 180 has a device for carrying sheets of TA paper, a thermal head, a fixing lamp and the like. When a color image is photographically printed on a sheet of TA paper, the print engine 180 first carries the sheet of TA paper, while making the Y signal to control the thermal head to make the yellow layer of the sheet of TA paper color, then to fix the yellow color by the fixing lamp. The magenta layer and the cyan layer of the sheet of TA paper are made color based on the M signal and the C signal in the similar manner. Through the process, a color image is photographically printed on the sheet of TA paper. Although the printer of the embodiment is a TA printer, the present invention is not limited to the printer and may be applied to a printer of the other type such as a thermal printer or an ink jet printer.

Now, catch light emphasizing process in the abovementioned image processing unit 120 will be described.

FIG. 2 is a block diagram showing an embodiment of a catch light emphasizing processing unit 200 of the image processing unit 120.

As shown in FIG. 2, the catch light emphasizing processing unit 200 includes a morphology processing unit 210, a subtracter 220, a threshold processing unit 230, a catch light candidate points narrowing unit 240, a pupil region extracting unit 250, and a contrast emphasizing processing unit 260.

The catch light emphasizing processing unit 200 inputs a brightness-signal Y (hereinafter referred to as an "original image Y") of a brightness-signal Y and a color-difference signals Cr, Cb generated from R, G, B signals. The original image Y is generated by the expression below:

$$Y = 0.3R + 0.6G + 0.1B \quad \text{[Expression 1]}$$

based on R, G, B signals. If an image data is in a JPEG format and saved by the YCrCb scheme, the image can be generated by using stored the Y signal without generating the Y signal from R, G, B signals.

The abovementioned original image Y is applied to the morphology processing unit 210. The morphology processing is divided into two types: "processing for the binary digit image" and "processing for the serial gradation (for example, 8 bits of 256 gradations) image". The present invention uses "processing for the serial gradation image".

The abovementioned morphology processing unit 210 performs opening processing, in which dilation processing is performed after erosion processing, by using a predetermined structural element b on an original image Y to be inputted. The morphology processing unit 210 outputs processed image $Y_{-opening}$, which was subjected to the morphology processing, to a negative input of the subtracter 220.

That is to say, the morphology processing unit 210 has an erosion processing unit 212 indicated by a sign of encircled −, and a dilation processing unit 214 indicated by a sign of encircled + as shown in FIG. 2. An original image Y and a structural element b are applied to the erosion processing unit 212. A processed image after erosion processing and a structural element b are applied to the dilation processing unit 214.

FIG. 3A shows a flow of erosion processing and FIG. 3B shows a flow of dilation processing.

Here, a region D of 5×5 as shown in FIG. 4A is taken around a pixel of interest (x,y) of the original image Y. A morphology filter sized 5×5 is used as a structural element b (u,v) as shown in FIG. 4B. For b (u,v), 0 is set in (−2,−2), (0,0) and (2,2), and the minimum value (−256) is set in the other regions.

As shown in FIG. 3A, the erosion processing is to subtract a structural element b (u,v) from an image Y (x +u, y +v) in the region D of 5×5 which is cut out around the pixel of interest (x,y) of the original image Y, to select the minimum value of the subtracted results and to make the value as a value of the pixel of interest (x,y).

When the structural element b (u,v) shown in FIG. 4B is used, the minimum value of pixel values of three pixels (x−2, y−2), (x,y), (x+2, y+2) in the region D is employed as the pixel value of the pixel of interest (x,y). As the pixel value in the catch light region is bigger (brighter) than the pixel values around it, it is replaced with a pixel value around in the catch light region if the pixel of interest is in the catch light region.

In this manner, the catch light and a region having the same characterizing amount as that of the catch light are removed from the original image Y. The size of the structural element b (u,v) is not limited to the embodiment and an appropriate size (for example, a size little bit bigger than the catch light region) is set according to the size of the catch light region. The direction in which the structural element b (u,v) is arranged is neither limited to the embodiment.

On the other hand, the dilation processing is to add the image Y (x+u, y+v) in the region D of 5×5 which is cut out around the pixel of interest (x,y) after subjected to the erosion processing and the structural element b (u,v), to select the maximum value of the added results, and to make the maximum value as the pixel of interest (x,y), as shown in FIG. 3B.

The erosion processing is the processing for reducing an outline or the like of an original image toward inside the image. By performing dilation processing on an image subjected to the erosion processing, the outline or the like of the original image which was reduced inside the image is expanded outside, putting the outline on that of the original image.

That is to say, the processed image $Y_{-opening}$, which is subjected to the morphology processing 210 shown in FIG. 2, becomes an image which is the original image Y removed of a catch light and a region having the same characterizing amount as that of the catch light.

In FIG. 2, the original image Y is applied to a positive input of the subtracter 220. The subtracter 220 subtracts a processed image Y−opening, which is subjected to the morphology processing, from the original image Y and outputs the image indicating the difference $(Y-Y_{-opening})$ to the threshold processing unit 230. The difference image $(Y-Y_{-opening})$ is an image including a catch light and a region having the same characterizing amount as that of the catch light, a noise component and the like.

Figure 5:
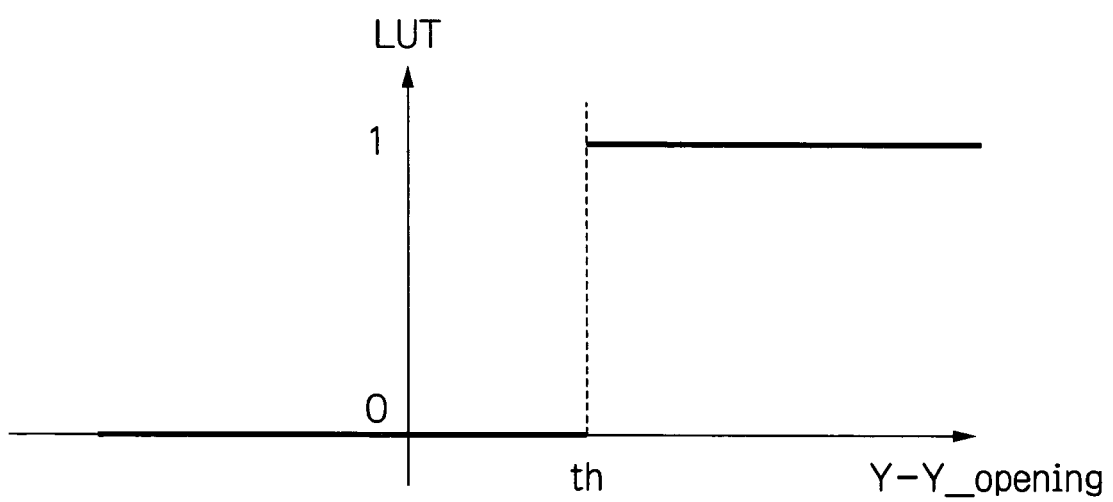
FIG. 5 is a diagram showing a LUT of a threshold processing unit.

The threshold processing unit 230 includes a look-up table (LUT) having an input/output characteristic as shown in FIG. 5. When a difference image to be input $(Y-Y_{-opening})$ exceeds a preset threshold th, the threshold processing unit 230 outputs a high level signal "1".

Figure 6A:
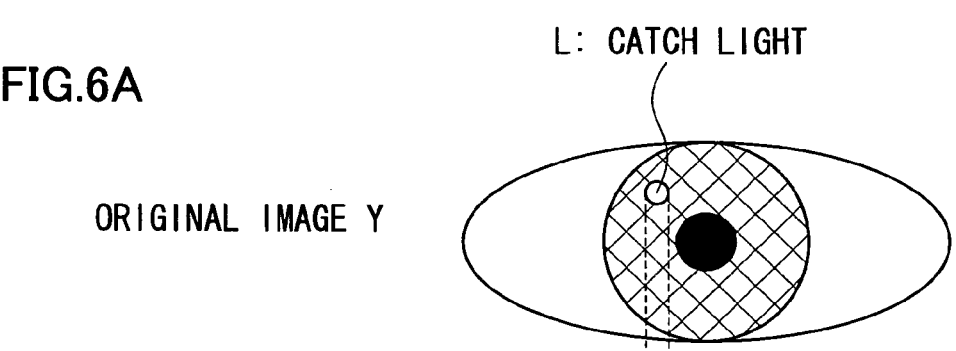
FIGS. 6A and 6B are diagrams for showing processing and the like of the threshold processing unit.

FIG. 6A shows an original image Y of an eye region. A catch light L is imaged in the pupil of the original image Y.

Figure 6B:
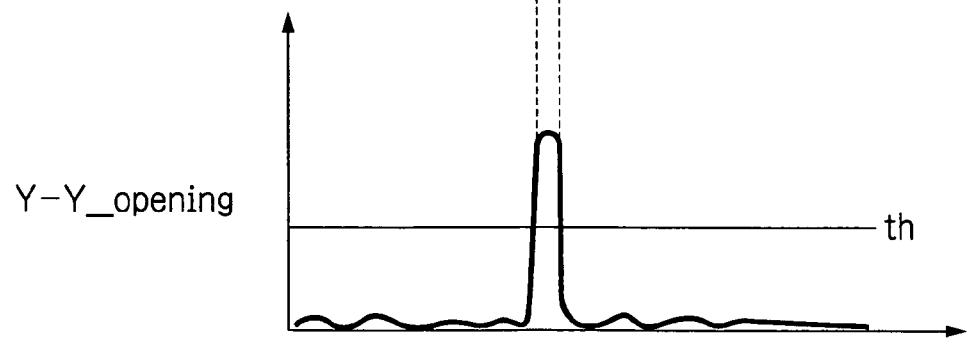

FIG. 6B shows a difference image $(Y-Y_{-opening})$ including the abovementioned catch light, in which a signal level of a part corresponding to the catch light L in the difference image $(Y-Y_{-opening})$ is high.

The threshold processing unit 230 retrieves a difference image $(Y-Y_{-opening})$ which exceeds a preset threshold th from the difference image $(Y-Y_{-opening})$ to be input as mentioned above and outputs a high level signal "1" only for the region. Accordingly, only the catch light region and the region having the same characterizing amount as that of the catch light region are retrieved from the threshold processing unit 230 as catch light candidate points (high level signal "1") and the noise is removed.

The catch light candidate points outputted from the threshold processing unit 230 are applied to the catch light candidate points narrowing unit 240.

On the other hand, the pupil region extracting unit 250 extracts a face region from the original image Y (or R, G, B signals, or a brightness signal Y and color difference signals Cr, Cb), and further extracts right and left pupil regions from the face region. As a method of extracting a face region or a pupil region, conventional arts can be used. The signal showing a pupil region extracted by the pupil region extracting unit 250 (signal showing a position inside the image (x,y)) is applied to the other input of the catch light candidate points narrowing unit 240.

The catch light candidate points narrowing unit 240 compares a catch light candidate points input from the threshold processing unit 230 and a signal indicating a pupil region input from the pupil region extracting unit 250, and narrows to extract only the catch light candidate points in the pupil region. The catch light candidate points narrowing unit 240 makes the catch light candidate points narrowed in this manner as a proper catch light points and specifies the region which includes the proper catch light points as a catch light region.

Figure 7:
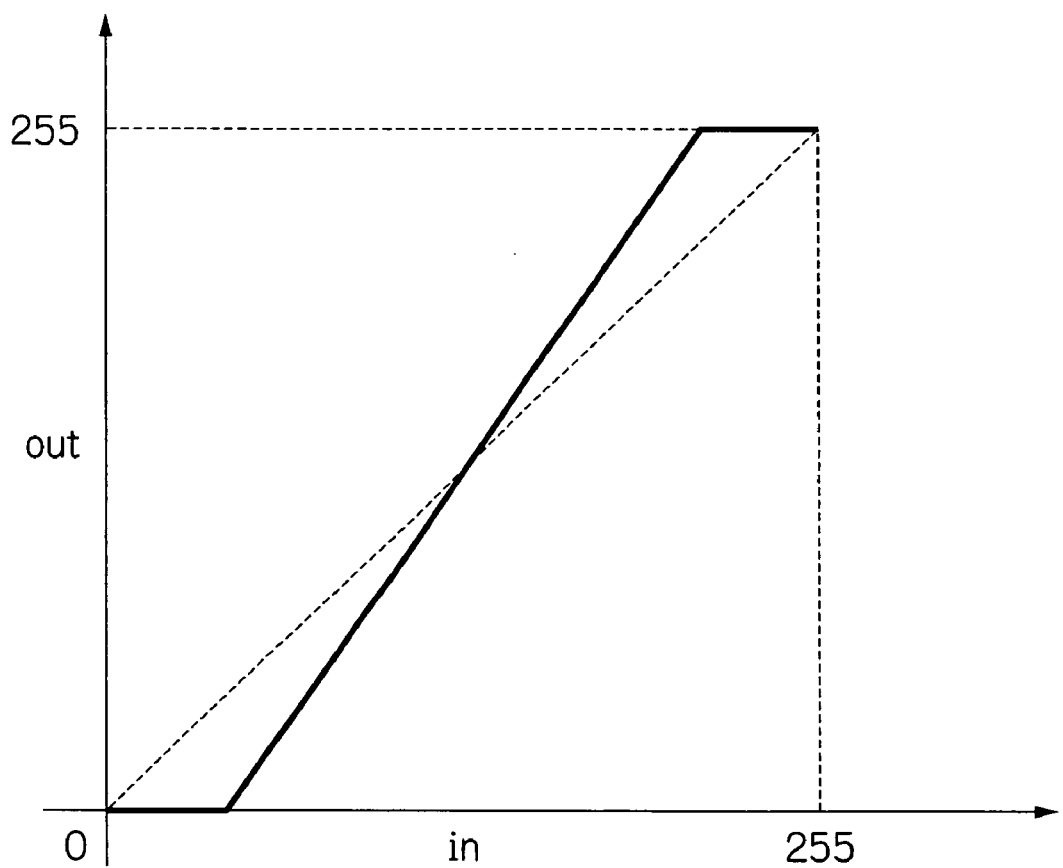
FIG. 7 is a diagram for showing the contrast emphasizing process at the contrast emphasizing processing unit.

The contrast emphasizing processing unit 260 is for emphasizing a contrast only in the specified region in the original image Y to input. The contract emphasizing processing unit 260 emphasizes a contrast of an image in the catch light region specified by the catch light candidate points narrowing unit 240. That is to say, the contrast emphasizing processing unit 260 includes a LUT having an input/output characteristic shown by a solid line in FIG. 7. The contrast emphasizing processing unit 260 emphasizes the contrast in the catch light region by the LUT to convert the grey level of the original image Y to be input (image in the catch light region).

The image Y' processed at the catch light processing unit 200 (brightness signal Y') and color difference signals Cr, Cb are retuned again to R, G, B signals in this manner, converted into Y, M, C signals as mentioned above and outputted to the print engine 180.

Although the contrast in the catch light region is emphasized in the embodiment, the present invention is not limited to emphasize the contrast. That is, process of enhancing brightness of a catch light region, process of enhancing sharpness of a catch light region, or expanding process for expanding a catch light region may be performed. Alternatively, the above process may be combined to emphasize the catch light region as required.

The catch light emphasizing process according to the present invention can be implemented by image processing software or hardware. The present invention is not limited to image processing in a printer and may be applied to any appliance which performs image processing.

What is claimed is:

1. An image processing method for processing a catch light in a pupil by utilizing one or more processors, comprising the steps of:
   performing, using at least one processor, morphology processing for removing a catch light in a pupil in an original image including a face image;
   calculating a difference between the original image and a processed image subjected to the morphology processing;
   extracting a catch light region which includes the catch light based on the calculated difference;
   specifying a catch light region in the original image based on the extracted catch light region; and
   emphasizing the specified catch light region against the original image.

2. The image processing method for processing a catch light in a pupil by utilizing one or more processors according to claim 1, wherein the step of performing morphology processing performs opening processing on the original image by using a structural element in a pixel size corresponding to the catch light region.

3. The image processing method for processing a catch light in a pupil by utilizing one or more processors according to claim 1, wherein the step of extracting a catch light region comprises:
   the step of calculating catch light candidate points by threshold processing the calculated difference with a predetermined threshold;
   the step of extracting a pupil region from the original image; and
   the step of narrowing catch light candidate points included in the extracted pupil region from the catch light candidate points, and
   wherein in the step of extracting a catch light region, the catch light region is extracted by making the narrowed catch light candidate points as catch light points.

4. The image processing method for processing a catch light in a pupil by utilizing one or more processors according to claim 2, wherein the step of extracting a catch light region comprises:
   the step of calculating catch light candidate points by threshold processing the calculated difference with a predetermined threshold;
   the step of extracting a pupil region from the original image; and
   the step of narrowing catch light candidate points included in the extracted pupil region from the catch light candidate points, and
   wherein in the step of extracting a catch light region, the catch light region is extracted by making the narrowed catch light candidate points as catch light points.

5. The image processing method for processing a catch light in a pupil by utilizing one or more processors according to claim 1, wherein the step of emphasizing a catch light region comprises at least one of process of emphasizing a contrast in the catch light region, process of enhancing brightness, process of enhancing sharpness, and expanding process.

6. The image processing method for processing a catch light in a pupil by utilizing one or more processors according to claim 2, wherein the step of emphasizing a catch light region comprises at least one of process of emphasizing a contrast in the catch light region, process of enhancing brightness, process of enhancing sharpness, and expanding process.

7. The image processing method for processing a catch light in a pupil by utilizing one or more processors according to claim 3, wherein the step of emphasizing a catch light region comprises at least one of process of emphasizing a contrast in the catch light region, process of enhancing brightness, process of enhancing sharpness, and expanding process.

8. The image processing method for processing a catch light in a pupil by utilizing one or more processors according to claim 4, wherein the step of emphasizing a catch light region comprises at least one of process of emphasizing a contrast in the catch light region, process of enhancing brightness, process of enhancing sharpness, and expanding process.

9. An image processing apparatus, comprising:
   an image inputting device for inputting an original image including a face image;
   a morphology processing device for performing morphology processing on the inputted original image and obtaining a processed image which is an image removed of a catch light in the pupil in the original image;
   a calculating device for calculating a difference between the original image and a processed image subjected to the morphology processing;
   a catch light region extracting device for extracting a catch light region which includes the catch light based on the calculated difference;
   a catch light region specifying device for specifying a catch light region in the original image based on the extracted catch light region; and
   a catch light region emphasizing device for emphasizing the specified catch light region against the original image.

10. A computer readable storage medium storing an image processing computer program, the computer program when executed causes a processor to perform the steps of:
   inputting an original image including a face image;
   performing morphology processing on the inputted original image and obtaining a processed image which is an image removed of a catch light in the pupil in the original image;
   calculating a difference between the original image and a process image subjected to the morphology processing;
   extracting a catch light region which includes the catch light based on the calculated difference;
   specifying a catch light region in the original image based on the extracted catch light region; and
   emphasizing the specified catch light region against the original image.

* * * * *